(12) United States Patent
Kim et al.

(10) Patent No.: US 11,262,789 B2
(45) Date of Patent: Mar. 1, 2022

(54) CURVED DISPLAY DEVICE

(71) Applicant: Samsung Display Co., Ltd., Yongin-Si (KR)

(72) Inventors: Yu Bin Kim, Yongin-si (KR); Won Chul Lee, Yongin-si (KR)

(73) Assignee: Samsung Display Co., Ltd.

(*) Notice: Subject to any disclaimer, the term of this patent is extended or adjusted under 35 U.S.C. 154(b) by 0 days.

(21) Appl. No.: 17/023,285

(22) Filed: Sep. 16, 2020

(65) Prior Publication Data

US 2021/0132652 A1 May 6, 2021

(30) Foreign Application Priority Data

Nov. 4, 2019 (KR) .......................... 10-2019-0139769

(51) Int. Cl.
*G06F 1/16* (2006.01)
*G02F 1/13357* (2006.01)
*G02F 1/1333* (2006.01)

(52) U.S. Cl.
CPC ...... *G06F 1/1601* (2013.01); *G02F 1/133308* (2013.01); *G02F 1/133602* (2013.01); *G02F 1/133317* (2021.01); *G02F 1/133322* (2021.01)

(58) Field of Classification Search
CPC ......... G02F 1/133305; G02F 1/133308; G06F 1/1618
See application file for complete search history.

(56) References Cited

U.S. PATENT DOCUMENTS

| 9,366,802 | B2 | 6/2016 | Lee et al. | |
| 9,933,643 | B2 | 4/2018 | Chong et al. | |
| 2015/0145755 | A1* | 5/2015 | Yamazaki | G09G 3/03 345/76 |
| 2016/0295711 | A1* | 10/2016 | Ryu | H05K 5/03 |
| 2019/0196082 | A1 | 6/2019 | Jeong et al. | |
| 2019/0227369 | A1 | 7/2019 | Park et al. | |

FOREIGN PATENT DOCUMENTS

| KR | 10-2017-0094047 A | 8/2017 |
| KR | 10-1915733 B1 | 11/2018 |
| KR | 10-2019-0079727 A | 7/2019 |
| KR | 10-2019-0089113 A | 7/2019 |

* cited by examiner

*Primary Examiner* — Kevin M Nguyen
(74) *Attorney, Agent, or Firm* — Innovation Counsel LLP (57) ABSTRACT

A curved display device may include a display panel and a chassis member. The display panel may include a first edge and a second edge. The first edge may be longer than the second edge and may be convex in a back direction. The second edge may be convex in an image-displaying direction. The back direction and the image-displaying direction may be with reference to the display panel. The chassis member may be coupled to the display panel and may support the display panel.

18 Claims, 7 Drawing Sheets

CURVED DISPLAY DEVICE

CROSS-REFERENCE TO RELATED APPLICATION

The application claims priority to and the benefit of Korean Patent Application No. 10-2019-0139769, filed on Nov. 4, 2019 in the Korean Intellectual Property Office; the Korean Patent Application is incorporated by reference.

BACKGROUND

Field

The technical field relates to a curved display device.

Related Art

Display devices may display images and/or videos to be viewed by users. Modern display devices may include liquid crystal display devices, organic light emitting display devices, and plasma display devices.

A curved display device may be a display device that includes a curved image-displaying surface. A curved display device may provide stereoscopic and/or immersive experiences to a user.

SUMMARY

An embodiment may be related to a curved display device with minimum black mura in displayed images.

The curved display device may include a display panel including a long edge having a forward curvature that is convexly curved in a back direction and a short edge having a reverse curvature that is convexly curved in an opposite direction to the back direction; and a chassis member coupled to the display panel and supporting the display panel such that the forward curvature and the reverse curvature are maintained.

The chassis member may be coupled to front and rear surfaces of a peripheral portion of the display panel to form a frame of the display panel.

The chassis member may include a seating surface in the form of an arch having a curvature corresponding to the reverse curvature in a region coupled to the short edge.

An opposite side of the seating surface in the form of the arch may be flat.

The long edge may include a constant curvature portion having a constant curvature.

A central portion of the long edge may include a section in which a curvature gradually increases or decreases, and at least some of remaining portions except for the central portion of the long edge may include a straight line section without curvature.

The central portion of the long edge may include the section corresponding to a graph according to a sine function.

The short edge may include a constant curvature portion having a constant curvature.

A central portion of the short edge may include a section in which a curvature gradually increases or decreases, and at least some of remaining portions except for the central portion of the short edge may include a straight line section without curvature.

The central portion of the short edge may include the section corresponding to a graph according to a sine function.

A first depth at which the short edge is convexly curved in the opposite direction to the back direction may be determined based on a length of the long edge.

The first depth may be no greater than 0.15% of the length of the long edge.

A first depth at which the short edge is convexly curved in the opposite direction to the back direction may be determined based on a second depth at which the long edge is convexly curved in the back direction.

The first depth may be no greater than 0.62% of the second depth.

The display panel may include a pixel unit including a plurality of pixels, a data driver providing a data signal to the pixels through data lines, a scan driver providing a scan signal to the pixels through scan lines, and a timing controller for controlling operations of the data driver and the scan driver.

An embodiment may be related to a curved display device. The curved display device may include a display panel and a chassis member. The display panel may include a first edge and a second edge. The first edge may be longer than the second edge and may be convex in a back direction. The second edge may be convex in an image-displaying direction. The back direction and the image-displaying direction may be with reference to (an image-displaying surface of) the display panel. The chassis member may be coupled to the display panel and may support the display panel.

The chassis may maintain a curvature of the first edge.

The chassis may maintain a curvature of the second edge.

The chassis member may include a first surface portion and a second surface portion. Both the first surface portion and the second surface portion overlap a peripheral portion of the display panel. The peripheral portion of the display panel may neighbor a display area of the display panel. The first surface portion may be convex in the back direction. The second surface portion may be convex in the image-displaying direction.

The chassis member may include a convex support surface. A curvature of the convex support surface may correspond to (e.g., may be equal to and/or may match) a curvature of the second edge.

The chassis member may include a flat surface that overlaps the convex support surface.

The first edge may include a curved section that has a constant curvature.

The first edge may include consecutive curved sections having gradually increasing or decreasing curvatures. The first edge may include a straight section directly connected to one of the consecutive curved sections.

A curved section of the first edge may correspond to (e.g., may match) a curved section of a sine wave.

The second edge may include a constant curvature portion that has a constant curvature.

The second edge may include consecutive curved sections having gradually increasing or decreasing curvatures. The second edge may include a straight section directly connected to one of the consecutive curved sections.

A curved section of the second edge may correspond to (e.g., may match) a curved section of a sine wave.

A maximum depth of the second edge relative to two opposite ends of the second edge may depend on a length of the first edge.

The maximum depth of the second edge may be equal to or less than 0.15% of the length of the first edge.

A maximum depth of the second edge relative to two opposite ends of the second edge may depend on a maximum depth of the first edge relative to two opposite ends of the first edge.

The maximum depth of the second edge may be equal to or less than 0.62% of the maximum depth of the first edge.

The display panel may include the following elements: a pixel unit including pixels; data lines; scan lines; a data driver for providing data signals to the pixels through the data lines; a scan driver for providing scan signals to the pixels through the scan lines; and a timing controller for controlling operations of the data driver and the scan driver.

The display panel may be positioned between a center of the curvature of the first edge and a center of the curvature of the second edge.

A central section of the first edge may correspond to (e.g., may match) a curved section of a sine wave.

A central section of the second edge may correspond to (e.g., may match) a curved section of a sine wave.

DETAILED DESCRIPTION OF EMBODIMENTS

Example embodiments are described with reference to the accompanying drawings. Practical embodiments may be embodied in various forms and are not limited to the example embodiments.

Although the terms "first," "second," etc. may be used to describe various elements, these elements should not be limited by these terms. These terms may be used to distinguish one element from another element. A first element may be termed a second element without departing from teachings of one or more embodiments. The description of an element as a "first" element may not require or imply the presence of a second element or other elements. The terms "first," "second," etc. may be used to differentiate different categories or sets of elements. For conciseness, the terms "first," "second," etc. may represent "first-type (or first-set)," "second-type (or second-set)," etc., respectively.

Same or similar components may be denoted by the same reference numerals.

In the drawings, dimensions and/or relative dimensions may be exaggerated for clarity of presentation of layers and regions.

Figure 1:
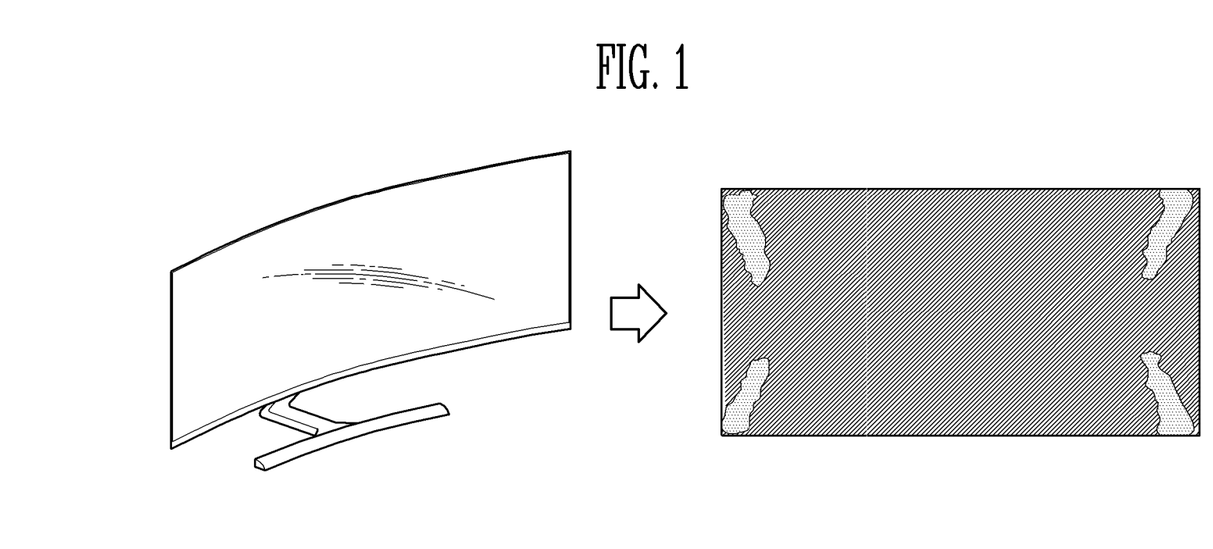
FIG. 1 is a conceptual diagram illustrating a black mura phenomenon according to an embodiment.

FIG. 1 is a conceptual diagram illustrating a black mura phenomenon according to an embodiment.

When a force is applied to a transparent object having transparency, birefringence with different light speeds may occur. This phenomenon is called a photoelastic effect. The birefringence caused by the photoelastic effect generates a phase difference in light waves passing through an object, and an interference fringe is caused by the generated phase difference. A magnitude of the phase difference is proportional to a shearing stress (or shear stress) applied to a surface of the object.

The shearing stress is concentrated in a specific portion of a curved surface of a curved display device, and the above-described photoelastic effect is generated due to the shearing stress. The photoelastic effect may cause a phase difference to light generated by a backlight device behind a display panel of the curved display device. As a result, the light may leak to the front surface of the curved display device.

Therefore, the curved display device may be prone to a black mura phenomenon in which the light of the backlight device behind the display panel of the curved display device leaks to the front surface of the curved display device when a screen of the curved display device is black.

Referring to FIG. 1, a screen of a curved display device may show black mura. Since the curved display device has a curvature from a center to left and right sides, stress is concentrated toward the left and right sides. Accordingly, as shown in FIG. 1, black mura may be conspicuous at four corner points of the curved display device.

Figure 2:
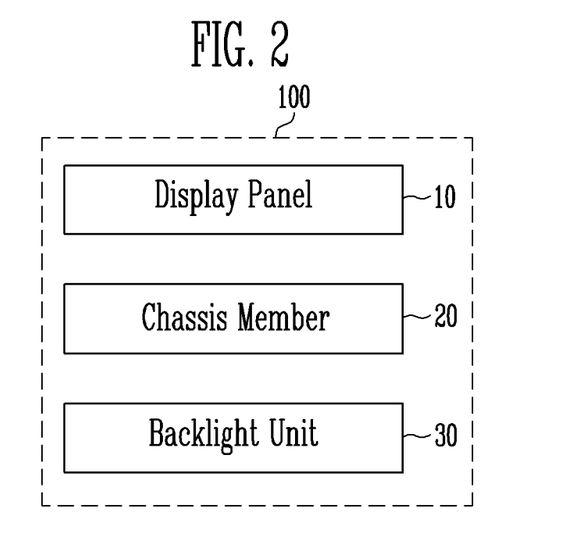
FIG. 2 is a block diagram illustrating a configuration of a curved display device according to an embodiment.

FIG. 2 is a block diagram illustrating a configuration of a curved display device according to an embodiment.

Referring to FIG. 2, a curved display device 100 may include at least one of a display panel 10, a chassis member 20, and a backlight unit 30.

The display panel 10 may have a display surface that is curved according to at least one predetermined curvature. The display panel 10 may include a plurality of pixels and may display an image on the display surface through the plurality of pixels. The display panel 10 may have a width that is longer than a height. For convenience of description, two upper and lower edges associated with the width of the display panel 10 are referred to as long edges, and two left and right edges associated with the height of the display panel 10 are referred to as short edges.

The backlight unit 30 may include a light source and may irradiate light to the display panel 10 using the light source.

The chassis member 20 may be coupled to the display panel 10 and may shape and/or maintain the curvature of the display panel 10. The coupling may include bonding or fastening. The chassis member 20 may be coupled to at least one of corner edges, the long edges, and the short edges of the display panel 10.

The chassis member 20 may cover a component/element that couples the chassis member 20 to the display panel 10. The chassis member may be coupled to front and/or rear surfaces of a peripheral portion of the display panel 10 and may form a frame of the display panel 10. The peripheral portion of the display panel 10 may neighbor an image-displaying area of the display panel 10.

The backlight unit 30 may be optional. The display panel 10 may include at least one of an organic light emitting device and an inorganic light emitting device, and the like, and may be self-emission display panel.

Figure 3:
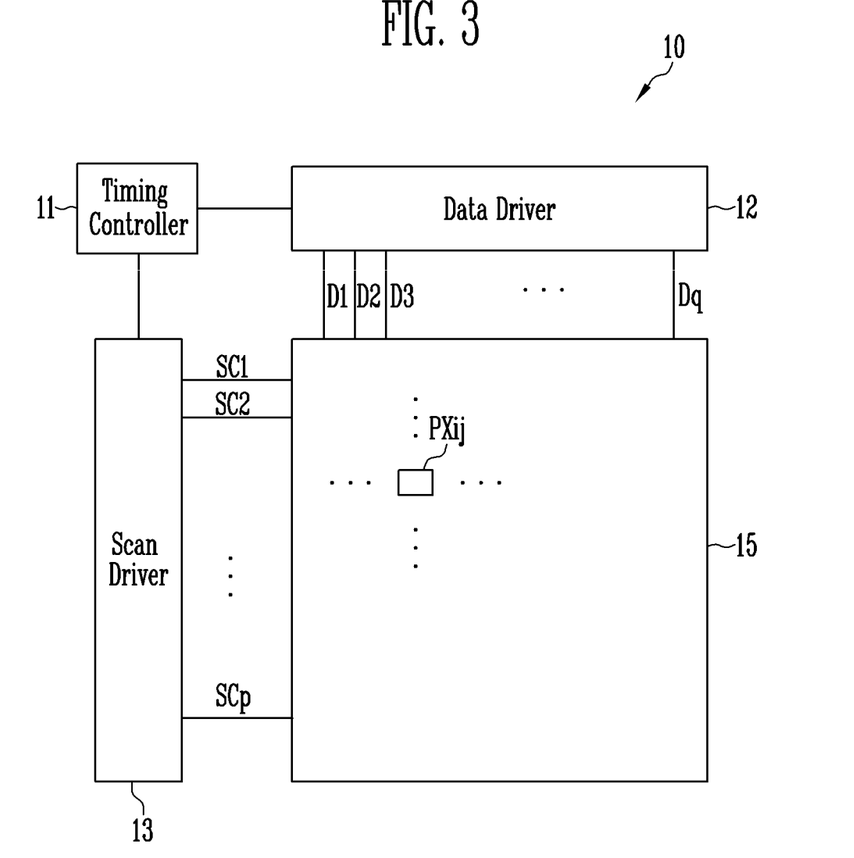
FIG. 3 is a conceptual block diagram illustrating elements of a display panel according to an embodiment.

FIG. 3 is a conceptual diagram illustrating elements of a display panel according to an embodiment.

Referring to FIG. 3, the display panel 10 may include at least one of a timing controller 11, a data driver 12, a scan driver 13, and a pixel unit 15.

The timing controller 11 may provide grayscale values for each frame, a control signal, and the like to the data driver 12. The timing controller 11 may provide a clock signal, a control signal, and the like to the scan driver 13.

The data driver 12 may generate data voltages to be provided to data lines D1, D2, D3, . . . , Dq using the grayscale values, the control signal, and the like received from the timing controller 11. The data driver 12 may sample the grayscale values using the clock signal, and apply the data voltages corresponding to the grayscale values to the data lines D1, D2, D3, . . . , Dq in pixel row units (for example, pixels connected to the same scan line), wherein q may be an integer greater than zero.

The scan driver 13 may receive the clock signal, the control signal, and the like from the timing controller 11 to generate scan signals to be provided to scan lines SC1, SC2, . . . , SCp. The scan driver 13 may sequentially provide the scan signals having pulses of a turn-on level to the scan lines SC1, SC2, . . . , SCp. The scan driver 13 may generate the scan signals in a manner of sequentially transferring a carry signal having a pulse of a turn-on level to a next stage according to the clock signal, wherein p may be an integer greater than zero. The scan driver 13 may be configured in the form of a shift register.

The pixel unit 15 may include pixels PXij. Each pixel PXij may be connected to a corresponding data line and a corresponding scan line, wherein i and j may be integers greater than zero.

Figure 4:
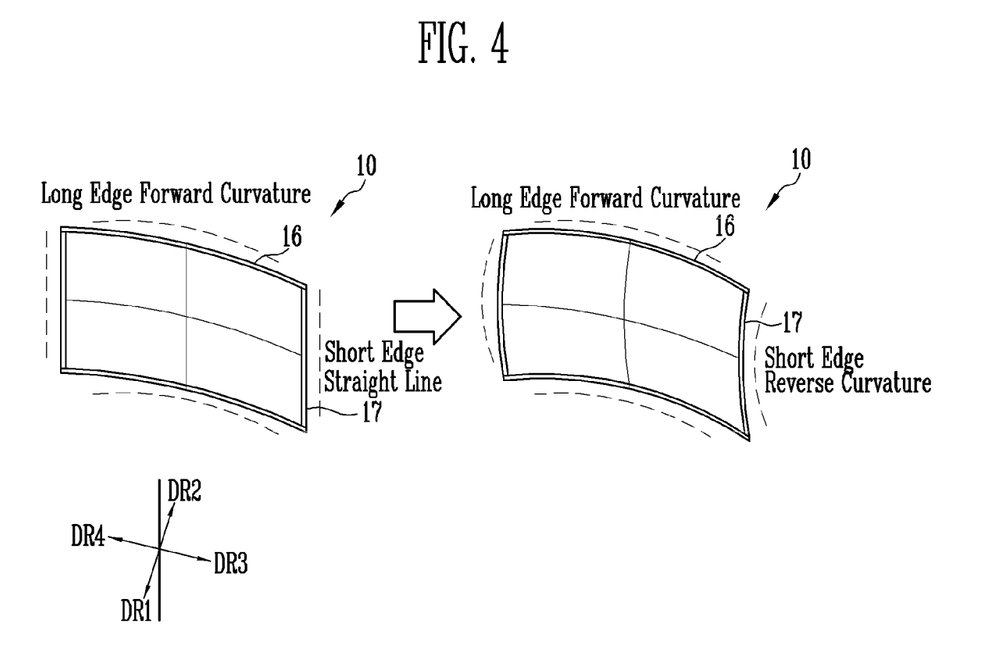
FIG. 4 is a diagram illustrating curvatures of a display panel according to an embodiment.

FIG. 4 is a diagram illustrating curvatures of a display panel according to an embodiment.

Referring to FIG. 4, a long edge 16 of the display panel 10 may have a forward curvature that is convexly curved in a back direction DR2 and has a center of curvature positioned in front of the image displaying surface the display panel 10. The back direction DR2 may be opposite to a front direction DR1 in which an image is displayed. Both the back direction DR2 and the front direction DR1 (or image-displaying direction DR1) are with reference to the image-displaying front surface of the display panel 10. The back direction DR2 may be or may not be aligned with or parallel to the front direction DR1.

Since the display panel 10 is curved convexly in the back direction DR2 due to the forward curvature, stress may be concentrated from the center toward the left and right sides (or the short edges of the display panel). In order to alleviate the concentration of such stress, a short edge 17 of the display panel 10 may have a reverse curvature that is convexly curved in the front direction DR1 (or in a direction opposite to the direction in which the forward curvature is formed), as shown in FIG. 4 and has a center of curvature positioned behind the image-displaying surface of the display panel 10.

The display panel 10 may have a planar shape before being mounted on the chassis member 20. Thereafter, the display panel 10 may be seated (or mounted) on the chassis member 20 (which may be manufactured in advance). The long edge 16 and the short edge 17 of the display panel 10 may be bent and/or guided to have the forward curvature and the reverse curvature, respectively. The display panel 10 may be manufactured to include the long edge 16 having the forward curvature and the short edge 17 having the reverse curvature before being mounted on the chassis member 20.

In FIG. 4, reference numerals DR3 and DR4 denote a straight line direction connecting start and end points (or two opposite end points) of the long edge 16 horizontally. The directions DR1, DR2, DR3, and DR4 illustrated in FIG. 4 are relative directions and may be interpreted differently according to the position orientation and/or direction in which the display panel is placed.

Figure 5:
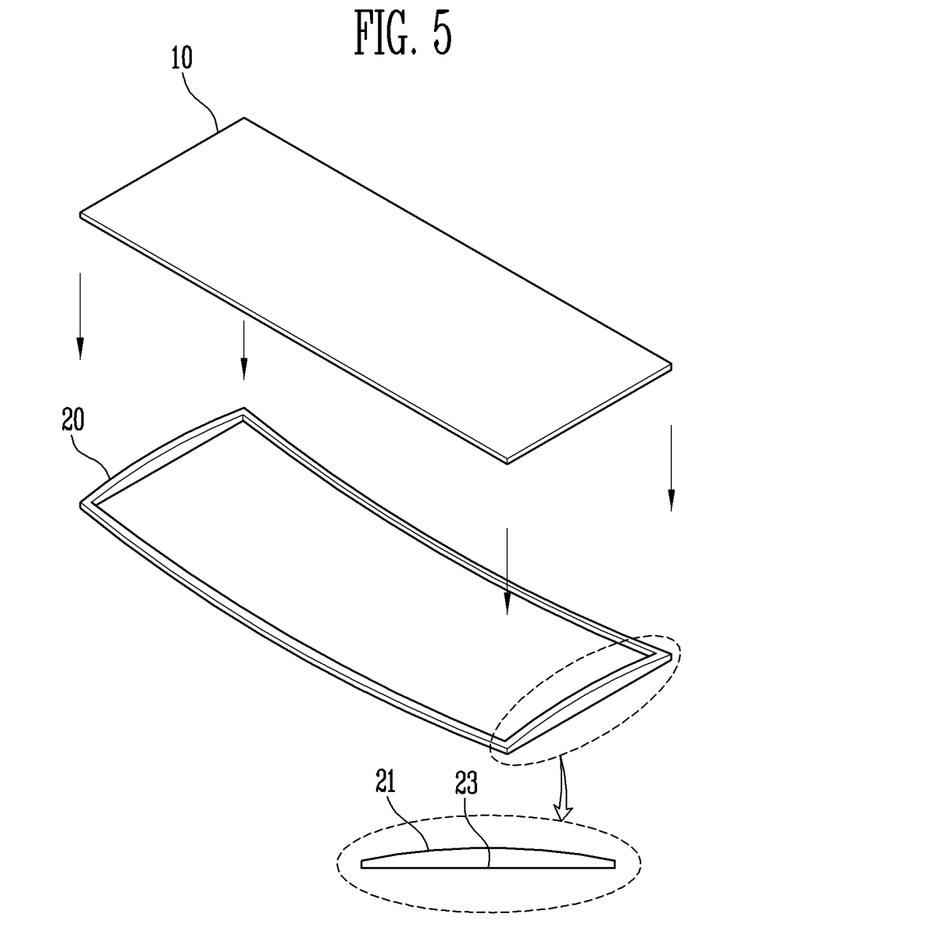
FIG. 5 is a diagram illustrating a chassis member for implementing a curvature of a display panel according to an embodiment.

FIG. 5 is a diagram illustrating a chassis member for implementing a curvature of a display panel according to an embodiment.

As described with reference to FIG. 4, the long edge of the display panel may have the forward curvature, and the short edge of the display panel may have the reverse curvature. For implementing the long edge and the short edge, the chassis member 20 may have a curved seating surface 21 (or curved support surface 21).

Referring to FIG. 5, the long edge and short edge of the display panel 10 may be seated/mounted on structures of the chassis member 20 that match the desired forward curvature and the desired reverse curvature, such that the long edge and the short edge of the display panel 10 may have the forward curvature and the reverse curvature, respectively.

The short edge of the display panel 10 may be disposed on the chassis member 20 on the curved seating surface 21, as shown in FIG. 5. The seating surface 21 may have a curvature corresponding to (e.g., equal to and/or matching) the reverse curvature applied to the short edge of the display panel 10. FIG. 5 shows the seating surface 21 may be coupled to the short edge of the display panel 10 in a direction perpendicular to the short edge of the display panel 10.

The short edge of the display panel 10 may be guided into and/or may conform to the corresponding structure of the chassis member 20, so that the short edge of the display panel 10 has the reverse curvature.

The chassis member 20 may have an opposite surface overlapping the seating surface 21, and the opposite surface may be curved and may match the curvature(s) of the seating surface 21 and/or the short edge 17. Referring to FIG. 5, the opposite surface 23 overlapping the seating surface 21 may be flat. When the opposite surface 23 is flat, a supplementary member may be disposed on the flat opposite surface 23 to form the curved seating surface 21. Therefore, the seating surface 21 may be easily implemented, and the forward curvature of the long edge may be prevented from being distorted by the reverse curvature.

Figure 6:
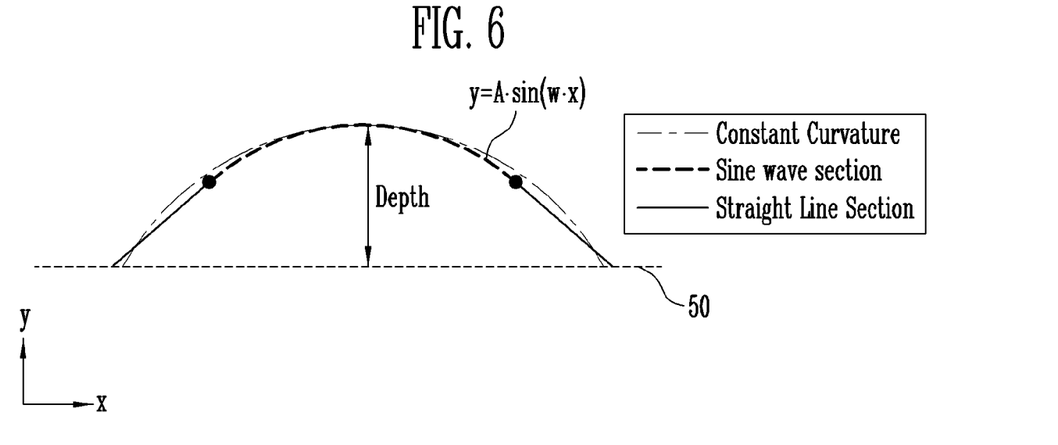
FIG. 6 is a conceptual diagram illustrating a shape/structure of curvatures of a display panel according to an embodiment.

FIG. 6 is a conceptual diagram illustrating a shape/structure of curvatures of a display panel according to an embodiment.

Referring to FIG. 6, the long edge or the short edge of the display panel may include a curved section in which the curvature is constant (a constant curvature section), a set of consecutive curved sections directly connected to the constant curvature section and having curvatures that gradually increase or decrease, and a straight line section directly connected to the set of consecutive curved sections.

In an embodiment, a central portion of the long edge or the short edge may include the section in which the curvature is constant and/or the sections in which the curvatures gradually increase or decrease. At least some of remaining portions (e.g., end portions) of the long edge or the short edge may include the straight line section without curvature.

The set of consecutive sections in which the curvatures gradually increase or decrease may have a shape corresponding to a section of a sine wave. For example, referring to FIG. 6, the central portion of the long edge or the short edge may include a curved shape specified by the sine function $y = A \cdot \sin(w \cdot x)$, wherein A is a first predetermined constant, and w is a second predetermined constant inversely proportional to a length of a reference line 50 connecting two opposite ends of the short edge or the long edge. When the reference line 50 is located on x-axis, the variable x may correspond to a position on the reference line 50, and the variable y may be a height/depth from the reference line 50 to a corresponding position on the long edge or the short edge.

The long edge or the short edge of the display panel may be determined using a distance (or referred to as a depth) protruding convexly in the front direction or the back direction of the display panel by the curvature.

The distance (or maximum distance) protruding convexly in the front direction (or an opposite direction to the back direction) from the reference line 50 connecting two opposite ends of the short edge in a straight line may be referred to as a first depth (or first maximum depth), and the distance (or maximum distance) protruding convexly in the back direction from the imaginary reference line 50 connecting two opposite ends of the long edge in a straight line may be referred to as a second depth (or second maximum depth). The first depth may be a distance at which the central portion (or a central point) of the short edge protrudes in the front direction from the reference line 50 associated with the short edge. The second depth may be a distance at which the central portion (or a central point) of the long edge protrudes in the front direction from the reference line 50 associated with the long edge.

Since a depth value (i.e., maximum depth value) may be calculated based on the central point of the long edge or the short edge, the depth value may be determined when a radius of curvature at the central point is specified. For example, using a relationship between a circumference of a circle, shown by the radius of curvature with respect to the central point, and a length of an arc with a height corresponding to the depth value, the depth value may derived as in Equation 1 below.

$$d = R \cdot \left(1 - \cos\frac{L}{2R}\right) \quad \text{Equation 1}$$

In Equation 1, a depth value d may be determined by a radius of curvature R of the central point and a length L of an edge (long edge or short edge) to which the curvature is applied. Hereinafter, a depth value should be interpreted to be determined using Equation 1.

When a first depth value (applied to the short edge of the display panel having the reverse curvature) is too large, the forward curvature of the long edge of the display panel may be distorted, and in some cases, the black mura phenomenon may be intensified.

Therefore, in order to alleviate the black mura phenomenon without distorting the forward curvature applied to the long edge of the display panel, it is necessary to limit the first depth (applied to the short edge of the display panel) not to exceed a certain threshold.

In order to solve these problems, an optimal depth value can be applied to the short edge of the display panel having the reverse curvature.

Figure 7:
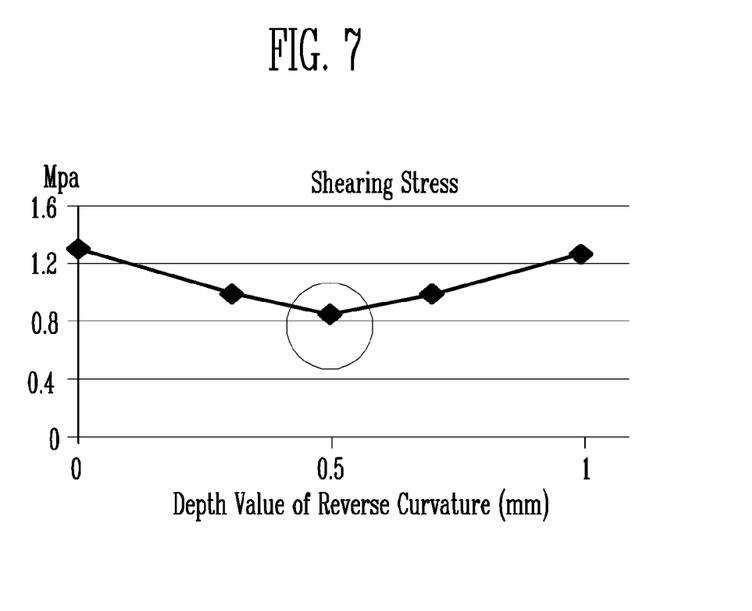
FIG. 7 is a graph illustrating a change in shearing stress according to depth values applied to a short edge of a display panel according to an embodiment.

FIG. 7 is a graph illustrating a change in shearing stress according to a depth value applied to a short edge of the display panel according to the embodiment.

Referring to FIG. 7, when the depth value is changed for the short edge of a 34-inch (809.42 mm*347.52 mm) display panel, results of measuring the black mura phenomenon and a change in the magnitude of shearing stress are recorded.

In FIG. 7, the radius of curvature according to the forward curvature applied to the long edge of the display panel is 1000 (mm) Referring to Equation 1, a depth value of 80.8 mm may be applied to the long edge. The depth value for the short edge of the display panel was changed to 0, 0.3, 0.5, 0.7, and 1.0 (mm) The depth value of 0 may mean that the short edge is flat without reverse curvature.

Based on the experimental environment as described above, shearing stress magnitudes measured at the left and right edges of the display panel are shown in the graph of FIG. 7, and the graph according to FIG. 7 may be represented as in Table 1 below.

TABLE 1

| Depth value of short edge (reverse curvature) (mm) | Magnitude of shearing stress (MPa) | Shearing stress ratio to plane (%) |
| --- | --- | --- |
| 0 (flat) | 1.29 | 100 |
| 0.3 | 0.99 | 77 |
| 0.5 | 0.85 | 66 |
| 0.7 | 0.98 | 76 |
| 1.0 | 1.28 | 99 |

Referring to Table 1 and the graph according to FIG. 7, as the depth value applied to the short edge of the display panel increases, the magnitude of shearing stress decreases, but the magnitude of shearing stress increases after a certain value. Therefore, the shearing stress may be minimized by limiting the depth value applied to the short edge of the display panel not to exceed 0.5 (mm) The optimal maximum depth value of 0.5 (mm) is a result measured when the 34-inch display panel is used. An optimal maximum depth value of a short edge may depend on a size of the display panel and a depth value applied to the long edge.

In an embodiment, the depth value applied to the short edge of the display panel may be limited based on a length of the short edge of the display panel and/or the depth value applied to the long edge of the display panel.

The depth value of 0.5 (mm) applied to the short edge of the display panel may be equal to about 0.15% of the length (347.52 mm) of the short edge of the display panel, and may be equal to about 0.62% of the depth value (80.8 mm) applied to the long edge of the display panel.

Therefore, the first depth value applied to the short edge of the display panel may be limited to 0.15% or less of the length of the short edge of the display panel. The first depth value applied to the short edge of the display panel may be limited to 0.62% or less of a second depth value applied to the long edge of the display panel. In embodiments, the optimal maximum depth of the short edge may be limited in consideration of both the length of the short edge of the display panel and the depth value applied to the long edge of the display panel.

Figure 8:
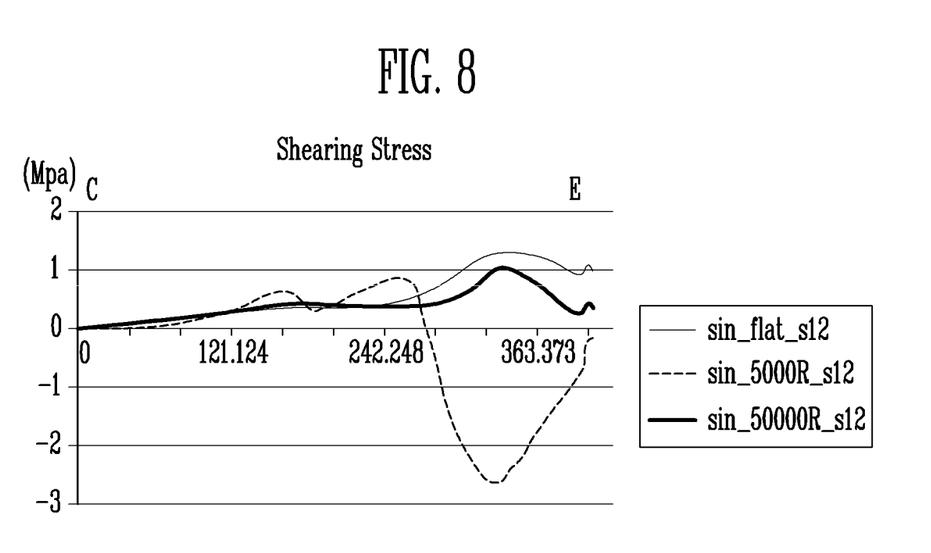
FIG. 8 is a graph illustrating shearing stress magnitudes according to positions on a display panel according to embodiments.

FIG. 8 is a graph illustrating shearing stress magnitudes according to positions on the display panel according to embodiments.

Referring to FIG. 8, measurement results of shearing stress magnitudes are recorded for the three configurations: [1] no reverse curvature is applied to the short edge of the display panel (sin_flat_s12), [2] the depth value 0.3019 mm corresponding to a radius of curvature of 5000 mm is applied to the short edge of the display panel (sin_5000R_s12), and [3] the depth value 3.0189 mm corresponding to a radius of curvature of 50000 mm is applied to the short edge of the display panel (sin_50000R_s12).

A forward curvature is applied to the long edge of the display panel. A curvature corresponding to a curved section of a sine wave is applied to the central portion of the long edge of the display panel, and the remaining portions of the long edge of the display panel are straight.

The display panel may be an LCD panel having a size of 34 inches (809.42 mm*347.52 mm) A lower chassis member in the form of a frame may be coupled to four edges of the display panel and may be fixed, and the display panel may be placed on the fixed lower chassis member. An upper chassis member may be coupled to the lower chassis member at the front of the display panel. Portions of the lower chassis member coupled to the long edge and the short edge of the display panel may be curved to correspond to the forward curvature and the reverse curvature. The upper chassis member may have a structure that engages a structure of the lower chassis member to be engaged with the lower chassis member.

Under the above conditions, changes in shearing stress according to the distance from a vertical line (denoted as C point) positioned at a center of the display panel to a right edge (denoted as E point) are measured, and the measured results are shown in FIG. 8.

Referring to FIG. 8, the shearing stress tends to increase as the position changes from the center C of the display panel to the right edge E. In particular, when the radius of curvature at the central point of the short edge of the display panel is 5000 (mm) (sin_5000 R_s12), the degree of warpage of the display panel increases, and when the distance from the center C of the display panel is greater than a predetermined distance, the shearing stress can occur largely in a direction opposite to the direction of the shearing stress measured at the center C. On the other hand, when the radius of curvature at the central point of the short edge of the display panel is 50000 (mm) (sin_50000 R_s12), the shearing stress may be lower than the case where all points of the short edge are flat (sin_flat_s12).

The radius of curvature at the central point of the short edge may be converted into the depth value (or first depth value) according to Equation 1. Therefore, referring to FIG. 8, in order to prevent the short edge of the display panel from bending too much, the depth value of the short edge may be limited so as not to exceed a threshold value. The threshold value may be determined based on the depth value applied to the long edge or the length of the short edge, as described above with reference to FIG. 7.

A curved display device according to an embodiment can minimize black mura and may display a black image without significant unwanted heterogeneity.

In embodiments, the reverse curvature applied to the short edge of the curved display device may be optimized. Advantageously, distortion of the forward curvature on the long edge can be minimized, and black mura can be minimized.

The embodiments described above are illustrative. Various modifications are possible without departing from the scope of the appended claims.

What is claimed is:

1. A curved display device comprising:
    a display panel including a first edge and a second edge, wherein the first edge is longer than the second edge and is convex in a back direction, wherein the second edge is convex in an image-displaying direction, and wherein the back direction and the image-displaying direction are with reference to the display panel; and
    a chassis member coupled to the display panel and supporting the display panel.

2. The curved display device of claim 1, wherein the chassis member comprises a first surface portion and a second surface portion, wherein both the first surface portion and the second surface portion overlap a peripheral portion of the display panel, wherein the first surface portion is convex in the back direction, and wherein the second surface portion is convex in the image-displaying direction.

3. The curved display device of claim 1, wherein the chassis member includes a convex support surface, wherein a curvature of the convex support surface corresponds to a curvature of the second edge.

4. The curved display device of claim 3, wherein the chassis member includes a flat surface that overlaps the convex support surface.

5. The curved display device of claim 1, wherein the first edge includes a curved section that has a constant curvature.

6. The curved display device of claim 1, wherein the first edge includes consecutive curved sections having gradually increasing or decreasing curvatures, and wherein the first edge includes a straight section directly connected to one of the consecutive curved sections.

7. The curved display device of claim 1, wherein a curved section of the first edge matches a curved section of a sine wave.

8. The curved display device of claim 1, wherein the second edge includes a curved section that has a constant curvature.

9. The curved display device of claim 1, wherein the second edge includes consecutive curved sections having gradually increasing or decreasing curvatures, and wherein the second edge includes a straight section directly connected to one of the consecutive curved sections.

10. The curved display device of claim 1, wherein a curved section of the second edge matches a curved section of a sine wave.

11. The curved display device of claim 1, wherein a maximum depth of the second edge relative to two opposite ends of the second edge depends on a length of the second edge.

12. The curved display device of claim 11, wherein the maximum depth of the second edge is equal to or less than 0.15% of the length of the second edge.

13. The curved display device of claim 1, wherein a maximum depth of the second edge relative to two opposite ends of the second edge depends on a maximum depth of the first edge relative to two opposite ends of the first edge.

14. The curved display device of claim 13, wherein the maximum depth of the second edge is equal to or less than 0.62% of the maximum depth of the first edge.

15. The curved display device of claim 1, wherein the display panel includes:
    a pixel unit including pixels;
    data lines;
    scan lines;
    a data driver for providing data signals to the pixels through the data lines;
    a scan driver for providing scan signals to the pixels through the scan lines; and
    a timing controller for controlling operations of the data driver and the scan driver.

16. The curved display device of claim 1, wherein the display panel is positioned between a center of the curvature of the first edge and a center of the curvature of the second edge.

17. The curved display device of claim 1, wherein a central section of the first edge corresponds to a curved section of a sine wave.

18. The curved display device of claim 1, wherein a central section of the second edge corresponds to a curved section of a sine wave.

\* \* \* \* \*